US009725156B2

(12) United States Patent
Moret

(10) Patent No.: US 9,725,156 B2
(45) Date of Patent: Aug. 8, 2017

(54) ROTOR FAIRING, A ROTOR, AND AN AIRCRAFT

(71) Applicant: AIRBUS HELICOPTERS, Marignane (FR)

(72) Inventor: Robin Moret, Salon de Provence (FR)

(73) Assignee: AIRBUS HELICOPTERS, Marignane (FR)

(*) Notice: Subject to any disclaimer, the term of this patent is extended or adjusted under 35 U.S.C. 154(b) by 359 days.

(21) Appl. No.: 14/863,487

(22) Filed: Sep. 24, 2015

(65) Prior Publication Data

US 2016/0090171 A1  Mar. 31, 2016

(30) Foreign Application Priority Data

Sep. 26, 2014  (FR) ..................................... 14 02170

(51) Int. Cl.
B64C 7/00 (2006.01)
B64C 27/32 (2006.01)
B64C 27/04 (2006.01)

(52) U.S. Cl.
CPC ............... *B64C 7/00* (2013.01); *B64C 27/04* (2013.01); *B64C 27/32* (2013.01)

(58) Field of Classification Search
CPC ............ B64C 7/00; B64C 27/04; B64C 27/32
USPC ......................................... 416/244 R, 245 R
See application file for complete search history.

(56) References Cited

U.S. PATENT DOCUMENTS

| 3,056,456 | A | * | 10/1962 | Michel | ................ | B64C 7/00 |
| | | | | | | 244/130 |
| 3,181,815 | A | * | 5/1965 | Paul | ................ | B64C 27/001 |
| | | | | | | 244/17.11 |
| 4,212,588 | A | | 7/1980 | Fradenburgh | | |
| 5,156,527 | A | * | 10/1992 | Pancotti | ................ | B64C 27/35 |
| | | | | | | 416/131 |
| 5,249,925 | A | * | 10/1993 | Guimbal | ................ | B64C 11/32 |
| | | | | | | 416/134 A |
| 5,383,767 | A | * | 1/1995 | Aubry | ................ | B64C 27/45 |
| | | | | | | 416/134 A |
| 7,358,720 | B1 | * | 4/2008 | Maier | ................ | G01D 5/2013 |
| | | | | | | 324/207.26 |

(Continued)

FOREIGN PATENT DOCUMENTS

| EP | 2727832 | 5/2014 |
| FR | 1277459 | 12/1961 |
| FR | 2762582 | 10/1998 |

OTHER PUBLICATIONS

French Search Report for French Application No. FR 1402170, Completed by the French Patent Office on May 21, 2015, 6 Pages.

*Primary Examiner* — Dwayne J White
*Assistant Examiner* — Aaron R Eastman
(74) *Attorney, Agent, or Firm* — Brooks Kushman P.C.

(57) ABSTRACT

A fairing for a rotor, the fairing comprising a movable top half-shell, the fairing including a mover device provided with a slideway, the slideway being provided with a stationary portion secured to the head of the rotor, the slideway being provided with a movable portion secured to the top half-shell, the movable portion sliding in elevation along the stationary portion along an axis in elevation, the mover device including a driver device co-operating with the movable portion to move the movable portion in translation relative to the stationary portion from a closed extreme position to an open extreme position, and vice versa.

18 Claims, 6 Drawing Sheets

(56) References Cited

U.S. PATENT DOCUMENTS

| | | | |
|---|---|---|---|
| 8,021,121 B2* | 9/2011 | Mikkelsen | F03D 1/0658 415/4.3 |
| 8,175,762 B2* | 5/2012 | Trotter | B64C 25/26 244/100 R |
| 2009/0304511 A1* | 12/2009 | Brannon, III | B64C 7/00 416/179 |
| 2012/0219417 A1* | 8/2012 | Podgurski | B64C 27/00 416/1 |
| 2014/0271223 A1* | 9/2014 | Foskey | B64C 11/14 416/245 R |

* cited by examiner

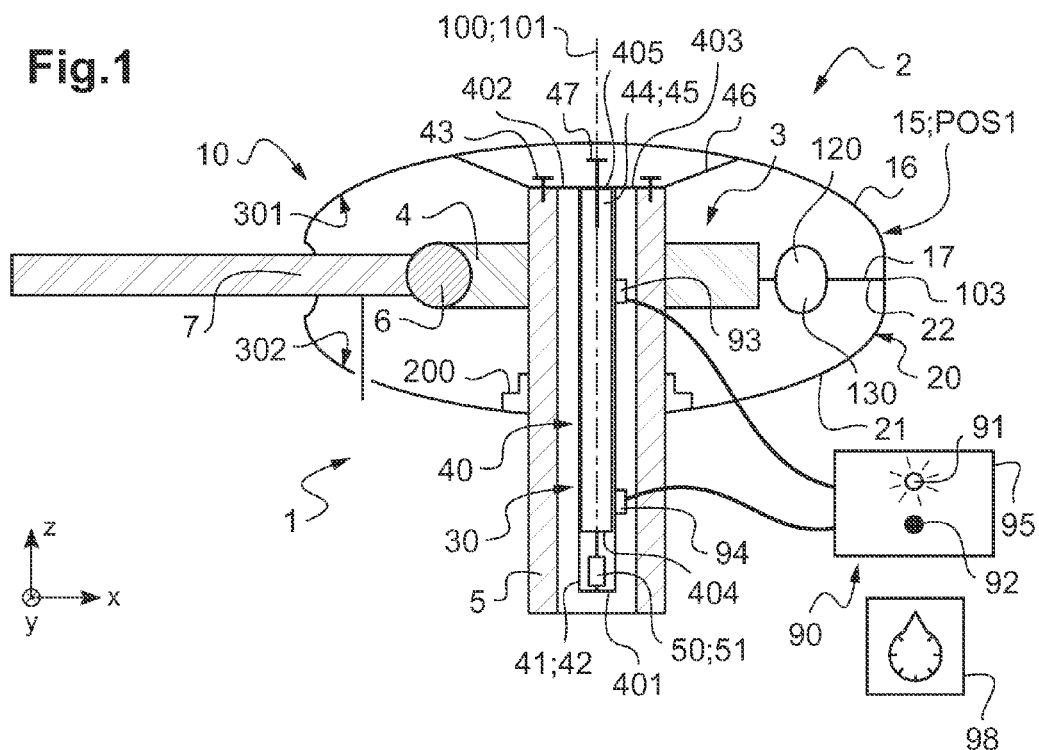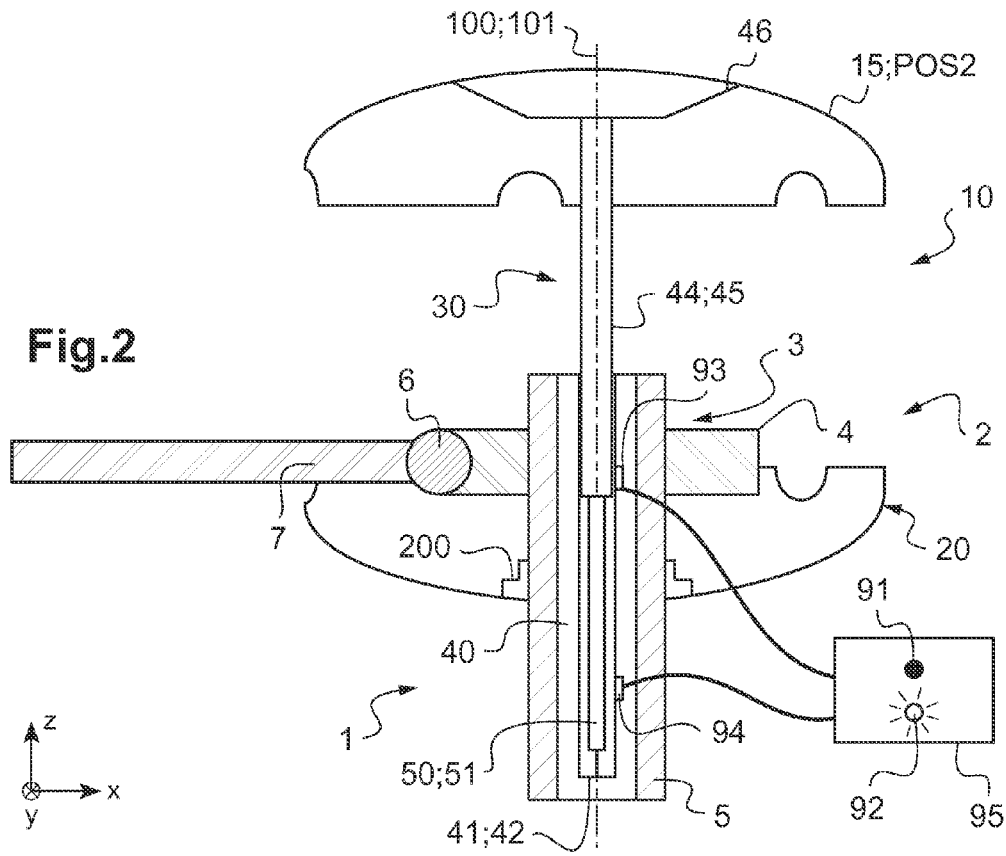

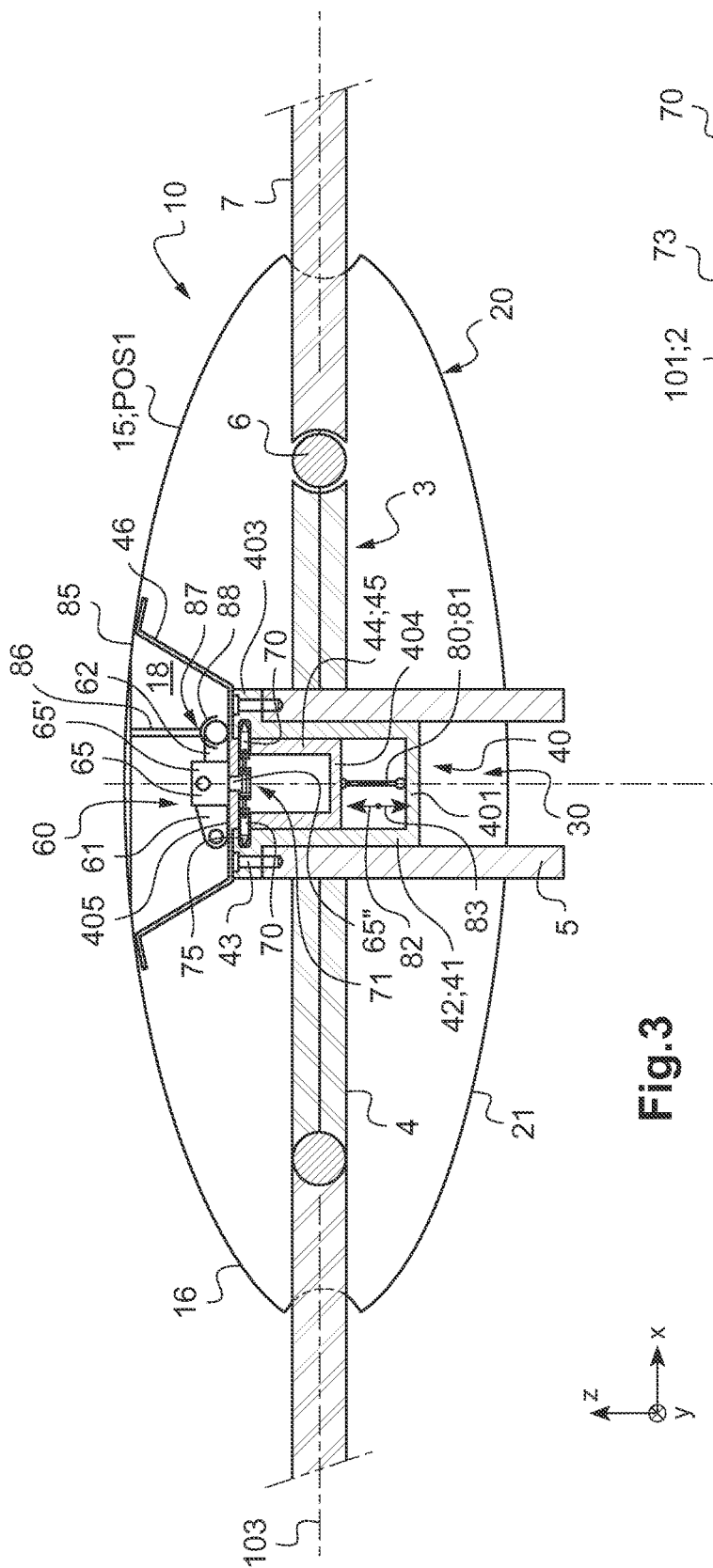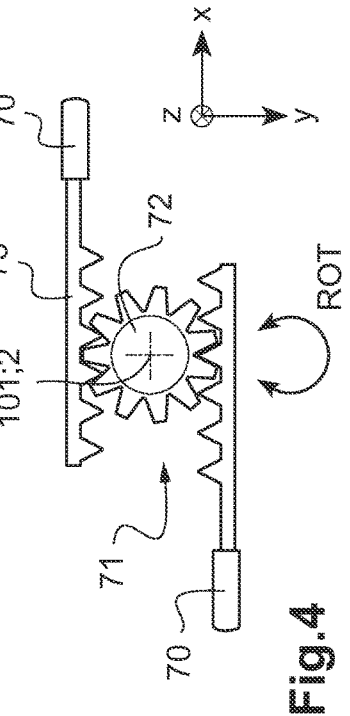

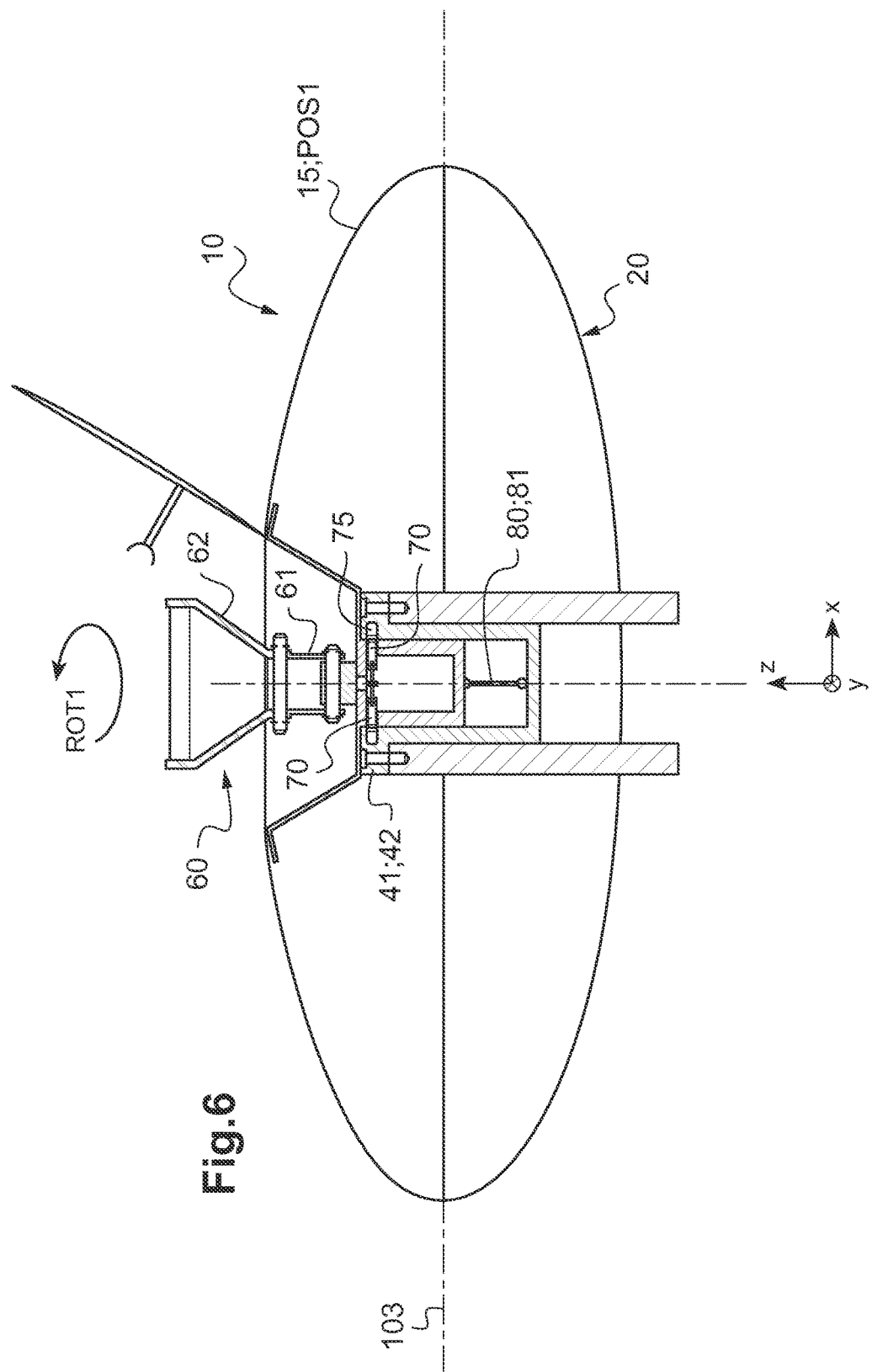

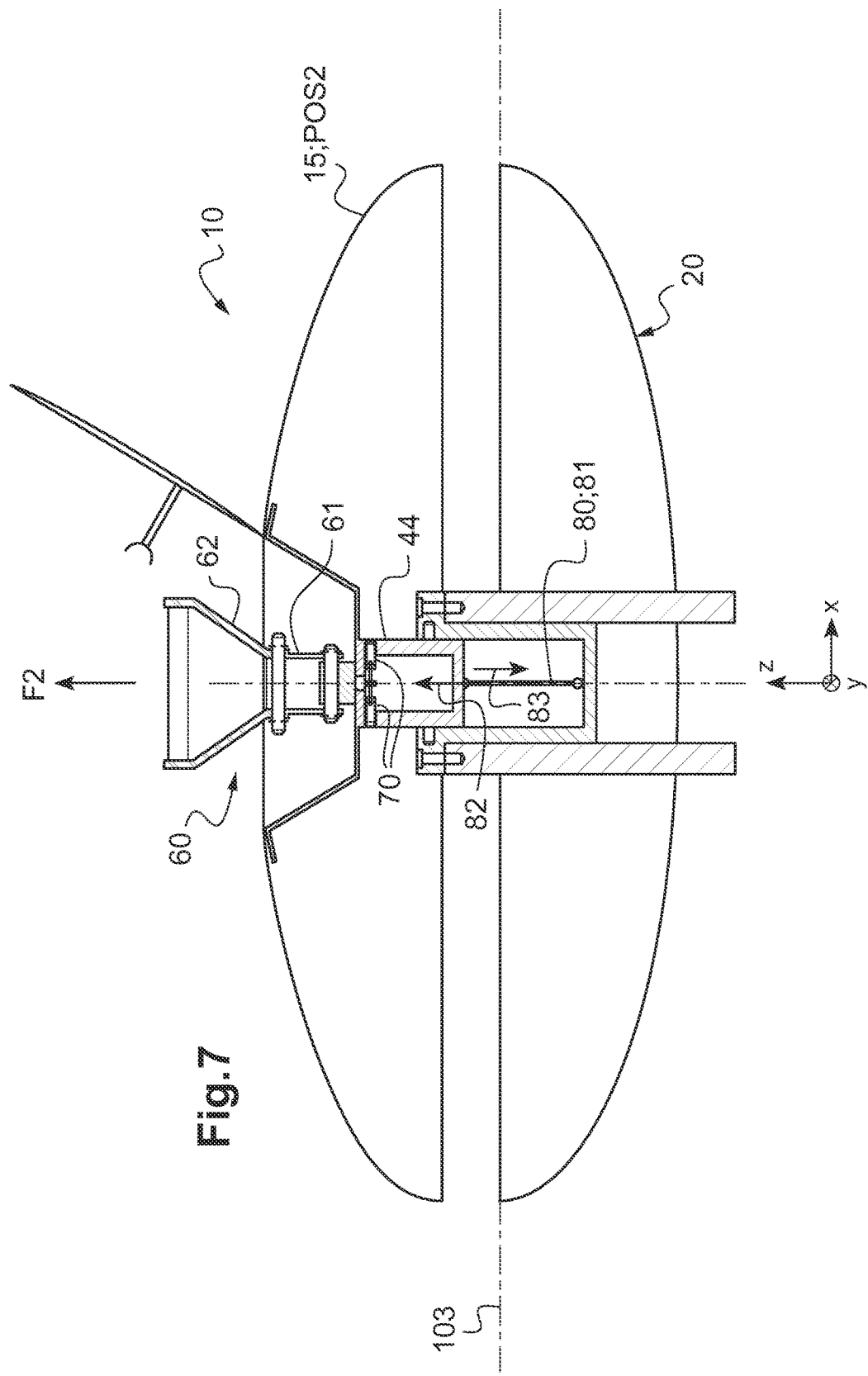

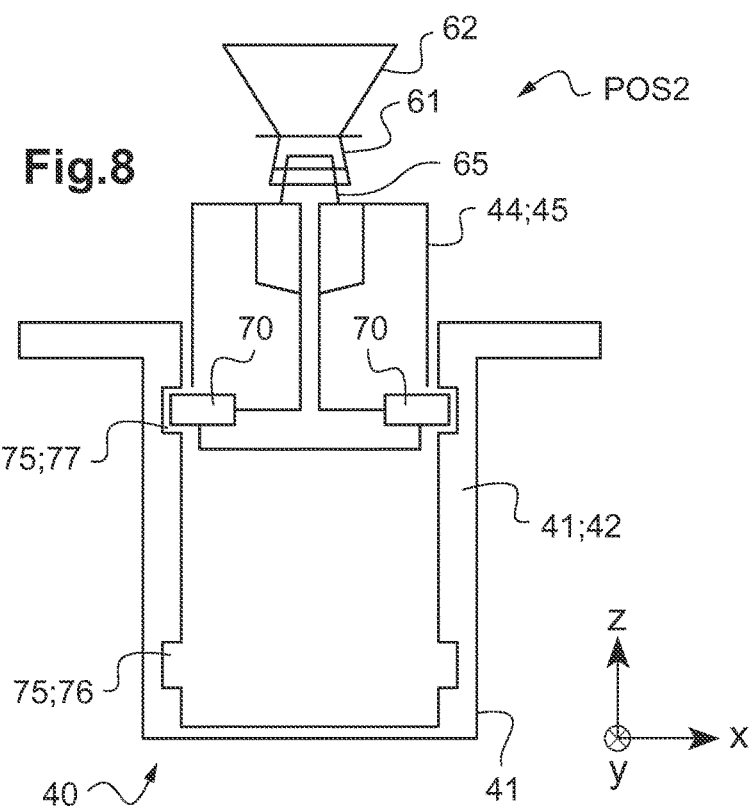
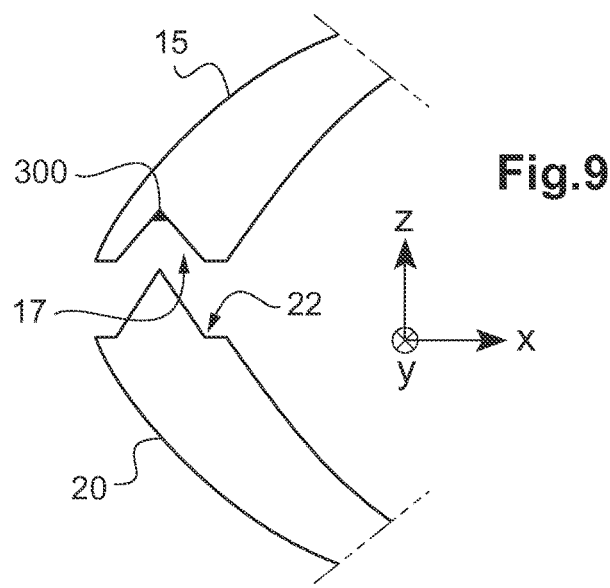
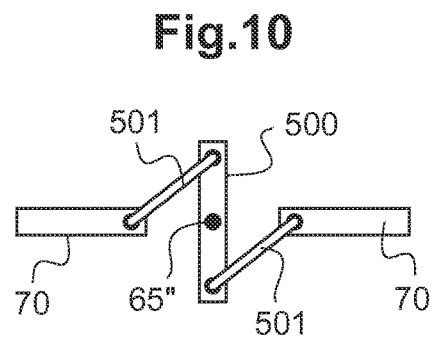

ROTOR FAIRING, A ROTOR, AND AN AIRCRAFT

CROSS REFERENCE TO RELATED APPLICATION

This application claims priority to French patent application No. FR 14 02170 filed on Sep. 26, 2014, the disclosure of which is incorporated in its entirety by reference herein.

BACKGROUND OF THE INVENTION (1) Field of the Invention

The present invention relates to a fairing for a lift rotor of an aircraft, and also to an aircraft provided with such a fairing, and in particular a rotorcraft.

(2) Description of Related Art

A rotorcraft conventionally comprises an airframe extending from a nose to a tail. The tail may comprise a tail boom carrying a fin and stabilizers.

The airframe may carry at least one rotor providing the rotorcraft with at least some of its lift and possibly with propulsion. Such a rotor is referred to below as a "lift rotor", and is sometimes referred to as a "main rotor" by the person skilled in the art.

In order to reduce the drag from a lift rotor, a rotorcraft may include a fairing surrounding the head of the lift rotor. The fairing is in the form of a closed cover. Each blade of the lift rotor then passes through an opening in the cover.

The fairing of the head of the rotor constitutes means that are effective for reducing the total drag of a rotorcraft, and thus for improving the aerodynamic efficiency of the rotorcraft and for improving its performance.

Unfortunately, such a fairing may constitute a handicap in terms of maintenance.

A fairing may comprise a bottom half-shell and a top half-shell in the form of a dome. The dome is fastened by numerous fastener elements of the screw-fastener type to a support connected to the head of the rotor.

Nevertheless, the head of the rotor is an element that needs to be inspected regularly, and that must therefore remain easily accessible. In particular, the head of the rotor must be visually inspected during a pre-flight inspection, i.e. before starting the aircraft.

In order to access a rotor head fitted with a screwed-on fairing dome, an operator must therefore remove the dome. That configuration requires non-negligible maintenance time, even for mere visual access to the rotor components such as the spherical abutments used for fastening blades or the ball joints of pitch rods, for example.

On each occasion that the rotor is inspected, a rotor head fairing provided with a dome that is fastened directly to the head of the rotor can thus require that the fastener elements of the dome be disassembled and then reassembled, which is tedious and takes time.

Consequently, few rotorcraft are provided with a fairing for the head of a rotor. The improvement in flight performance is found to be insufficient to justify the drawbacks that the fairing constitutes in terms of operational utilization of the rotorcraft.

Document FR 2 762 582 describes a dome for a rotor head. That dome is provided with two half-shells that are diametrically separated from each other.

The half-shells are connected to the head of a rotor by a combined pivoting and sliding mechanism. That mechanism has two rails on which the half-shells slide in a longitudinal direction that is substantially parallel to the axis of rotation of the rotor. Furthermore, each rail includes a central segment fastened to the head of the rotor, together with two end segments that can be pivoted relative to the central segment.

Documents FR 1 277 459 and U.S. Pat. No. 4,212,588 describe rotor fairings.

Document EP 2 727 832 is also known.

BRIEF SUMMARY OF THE INVENTION

An object of the present invention is thus to propose a fairing for a head of a rotor that seeks to provide rapid visual access to the members of the head of the rotor.

According to the invention, a fairing of a rotor comprises a top half-shell that is to be located above a rotor head. This top half-shell is provided with a single top body in the form of a dome.

In addition, the top half-shell is movable. The fairing then has a mover device for moving the top half-shell in elevation. The mover device includes a slideway, which slideway is provided with a portion referred to as the stationary portion that is for securing to the head of the rotor that is to be fitted therewith, the slideway also being provided with a "movable" portion that is secured to the top half-shell, the movable portion sliding in elevation along the stationary portion along an axis in elevation. Furthermore, the mover device includes a driver device co-operating with the movable portion in order to move the movable portion in translation relative to the stationary portion from a closed extreme position to an open extreme position, and vice versa, the top half-shell being in the closed extreme position in flight and in the open extreme position during a maintenance operation.

The term "movable" is used for a member that is suitable for moving in translation when the fairing is fastened on a rotor. Conversely, the term "stationary" is used for a member that is not suitable for making such a movement in translation when the fairing is fastened on a rotor. Thus, the stationary portion rotates in rotation about the axis of rotation of the rotor together with the head of the rotor, but it cannot slide along the axis in elevation when the fairing is fastened on a rotor.

In addition, the movable portion may be arranged around the stationary portion or within the stationary portion in order to slide along the stationary portion.

Document FR 2 762 582 proposes a dome having two half-bodies that slide in translation in a plane perpendicular to an axis in elevation of the dome, each half-body being tiltable relative to the plane in which it slides.

Conversely, the invention proposes a top half-shell comprising a single dome-shaped body. The top half-shell can nevertheless be moved in elevation. The mover device enables the top half-shell to be moved in translation in elevation by means of a slideway connection embodied by the slideway.

In the closed extreme position, the top half-shell is closer to the head of the rotor. The half-shell is positioned in particular in the closed extreme position while in flight in order to improve the aerodynamic characteristics of the rotor. The fairing then presents minimum spacing between the top half-shell and the head of the rotor or the stationary portion, for example.

Conversely, in the open extreme position, the top half-shell is moved away from the head of the rotor as far as possible. The fairing then presents maximum spacing between the top half-shell and the head of the rotor, or between the top half-shell and the stationary portion, for example. Consequently, the top half-shell is spaced apart from the head of the rotor so as to enable an operator to perform a maintenance operation.

Such a maintenance operation can then be undertaken with relative ease.

An operator operates the mover device to cause the movable portion of the slideway to slide along the stationary portion of the slideway so as to position the top half-shell in the closed extreme position or in the open extreme position.

Compared with embodiments in the state of the art, the invention makes it very simple to have visual access to the elements of the rotor head during the periodic inspections that are required by regulations. This solution does not constitute a major constraint for an operator compared with inspecting a head that does not have a fairing and therefore provides easy visual access to the head of the rotor.

Furthermore, the invention provides a significant reduction in the total drag of the aircraft in flight by fairing the rotor, at least in part.

The fairing can also release the entire circumference of the hub so as to facilitate access to all of the components of the hub without exception, unlike certain solutions that make use of longitudinal rails, for example.

Furthermore, the fairing is optionally removable. It thus remains possible to use a hoist system that co-operates with the rotor.

The fairing may also include one or more of the following additional characteristics.

Thus, the fairing may include a signaling device for indicating the position of the top half-shell, the signaling device having at least one sensor for determining whether the top half-shell is in the open extreme position and/or in the closed extreme position, and display means connected to said sensor.

The sensor may be a mechanical position sensor or an electrical position sensor.

For example, the display means may be means providing a visible warning or an audible warning. The signaling means may optionally be actuated when the top half-shell is in the open extreme position so as to prevent the aircraft flying under such conditions.

The display means may thus comprise an indicator that can be seen from the ground or from the cockpit and that serves to warn the crew or an observer in the event of the fairing not being locked in its "flight" condition, i.e. when the top half-shell is in the open extreme position. The crew must then verify that a "fairing not locked" indicator is indeed off before a flight.

Furthermore, the fairing may include a bottom half-shell facing the top half-shell, a portion of a periphery of the top half-shell referred to as the "top contact periphery" being in sealed contact in a junction plane with a portion of a periphery of the bottom half-shell referred to as the "bottom contact periphery" when in the closed extreme position, the junction plane being perpendicular to the axis in elevation, the top half-shell having a plurality of slots, each facing a slot in the bottom half-shell in order to pass a blade.

The bottom half-shell may comprise a single body in the form of an upside-down dome, i.e. that is U-shaped.

Under such circumstances, when the top half-shell is in the closed extreme position, the fairing takes the form of a cover. The cover is then open only via slots through which respective blades attached to the head of the rotor can pass radially.

The two half-shells then touch each other in a junction plane substantially perpendicular to the axis of rotation of the rotor and they are open so as to allow blades to pass through, while leaving room for blade flapping.

The top half-shell and the bottom half-shell may be mutually engaged one in the other in the closed extreme position, the bottom contact periphery co-operating by shape interference with the top contact periphery.

The half-shells thus present an appropriate interface at the junction between these two half-shells. This interface enables the half-shells to be positioned naturally relative to each other (concentricity, circular indexing) when the top half-shell is moved towards the bottom half-shell. For example, a conical contact surface enables the half-shells to be centered automatically relative to each other, and a conical key serves to provide indexing.

Conventional sealing means may be arranged at the junction between the two half-shells in order to limit air flow leaks that produce aerodynamic disturbances in flight. Likewise, the slots may include sealing systems.

The mover device may have multiple forms.

In a first embodiment, the driver device includes an actuator attached to the movable portion.

The top half-shell is then mounted on an actuator such as a hydraulic, pneumatic, or electrical actuator. The actuator is controlled by an operator in order to move the top half-shell away from or towards the bottom half-shell.

The actuator may be connected to high and low position sensors. The high and low position sensors serve to stop the actuator respectively when the top half-shell has reached the open extreme position and when it has reached the closed extreme position.

In a first embodiment, the top half-shell may be locked in the closed extreme position directly by the actuator, even in the event of an interruption to its power supply.

In a second embodiment, the driver device comprises a handle attached to the movable portion.

In this second embodiment, an operator takes hold of the handle in order to pull or push the top half-shell.

This second embodiment presents the advantage of being relatively simple.

For example, the handle is a hinged handle having a bottom segment hinged to the movable portion and a top segment hinged to the bottom segment.

Such a hinged handle may be retracted onto itself in order to minimize the space it occupies in flight.

Furthermore, said handle is advantageously housed in an internal housing of the top half-shell, said housing being closed in reversible manner by an access hatch. The access hatch may be circular. Furthermore, the access hatch may include a latch to guarantee that it is closed in flight.

In flight, the handle is arranged in a closed housing so as to avoid generating aerodynamic disturbances. The use of a hinged or retractable handle makes such an arrangement easier.

In addition, the access hatch may be provided with a pull-tab, the pull-tab having a free end carrying spring clip means engaged on said handle when the access hatch closes said housing.

The pull-tab facilitates extracting the handle when the access hatch is open. Turning the access hatch enables a traction force to be exerted on the handle.

Furthermore, the pull-tab may tend to hold the access hatch closed in flight.

Furthermore, the handle may be connected to the movable portion by a support, the support being hinged to the movable portion and being movable in rotation to turn relative to the movable portion about the axis in elevation of the fairing, the support being connected to at least one locking finger by a cam so that a turning movement of the support causes each locking finger to move in translation, the stationary portion including at least one orifice per locking finger, said movable portion being prevented from moving relative to the stationary portion when at least one locking finger penetrates into one of said orifices.

This system enables the half-shell to be locked in at least one position relative to the stationary portion with the help of a locking finger that is operated mechanically.

An operator turns the handle in order to move the locking fingers, e.g. in a direction that is orthogonal to the axis in elevation. When at least one locking finger is engaged in an orifice of the stationary portion, the top half-shell becomes secured to the stationary portion.

For example, the stationary portion includes a top orifice above a bottom orifice for each locking finger, each locking fingers being housed in a top orifice in the open extreme position of the top half-shell, each locking finger being housed in a bottom orifice in the closed extreme position of the top half-shell.

Under such circumstances, the locking fingers enable the top half-shell of the fairing to be locked in both of its extreme positions, i.e. in the closed extreme position and in the open extreme position.

Furthermore, the fairing includes assistance means for assisting in operating the top half-shell, the assistance means comprising a resilient member exerting a deployment force on the top half-shell tending to position it in the open extreme position.

In this variant, the resilient member may be a spring or a compressed air actuator for assisting the operator during the stage of lifting the top half-shell.

In order to ensure that manipulating the fairing is not considered to be a constraint compared with a rotor that does not have a fairing, this manipulation must, if possible, be performed in a very short length of time. Under such circumstances, using mechanical assistance for lifting purposes can be useful.

Such a resilient member is advantageously interposed between the movable portion and the stationary portion.

Furthermore, the deployment force may be less than the weight of said top half-shell. This deployment force serves to accompany the movement of the top half-shell.

Consequently, the top half-shell can return into the closed extreme position under its own weight.

In addition to a fairing, the invention provides a rotor having a rotor head. The head of the rotor includes firstly a mast that rotates about an axis of rotation and secondly a hub secured to said mast, said hub carrying a plurality of blades. The rotor includes a fairing of the invention, the stationary portion of the slideway being secured by reversible fastener means either to the hub or to the mast.

The mechanism then has sufficient travel to enable the top half-shell either to be completely raised above the head of the rotor during maintenance operations, or else to be as close as possible to the head of the rotor during stages of flight.

The fairing is also removable so as to enable a hoist operation to be performed on the hub without special difficulty, in particular during an operation of removing the entire mechanical assembly.

The rotor may also include one or more of the following characteristics.

For example, the stationary portion extends at least in part inside said mast.

The mast of a rotor is usually hollow. The slideway is then arranged in this variant inside the mast. This arrangement enables the slideway to avoid interfering with maintenance operations, unlike the rails in certain prior art arrangements.

Furthermore, the fairing extends in elevation along an axis in elevation coinciding with the axis of rotation.

This axis in elevation is advantageously an axis of symmetry of the fairing. Under such circumstances, this arrangement tends to minimize any risk of the fairing giving rise to unbalance.

Furthermore, the fairing may include a bottom half-shell, the bottom half-shell being fastened to the head of the rotor.

In addition to a rotor, the invention provides an aircraft including such a rotor.

The invention and its advantages appear in greater detail from the context of the following description of examples given by way of illustration with reference to the accompanying figures, in which:

FIG. 1 is a view of an aircraft having a fairing in a first embodiment in the closed extreme position;

FIG. 2 is a view of an aircraft fitted with a fairing in the first embodiment in the open extreme position;

FIG. 3 is a view of an aircraft fitted with a fairing in a second embodiment in the closed extreme position;

FIG. 4 is a view showing a cam for driving two locking fingers in translation;

FIG. 6 is a view of an aircraft fitted with a fairing in the second embodiment having an open access hatch and locking fingers disengaged from a stationary portion of a slideway;

FIG. 7 is a view of an aircraft fitted with a fairing in the second embodiment in the open extreme position;

FIG. 8 shows a stationary portion having high housings above low housings;

FIG. 9 shows the peripheries of two half-shells; and

FIG. 10 is a view showing a linkage for driving two locking fingers in translation.

Figure 5:
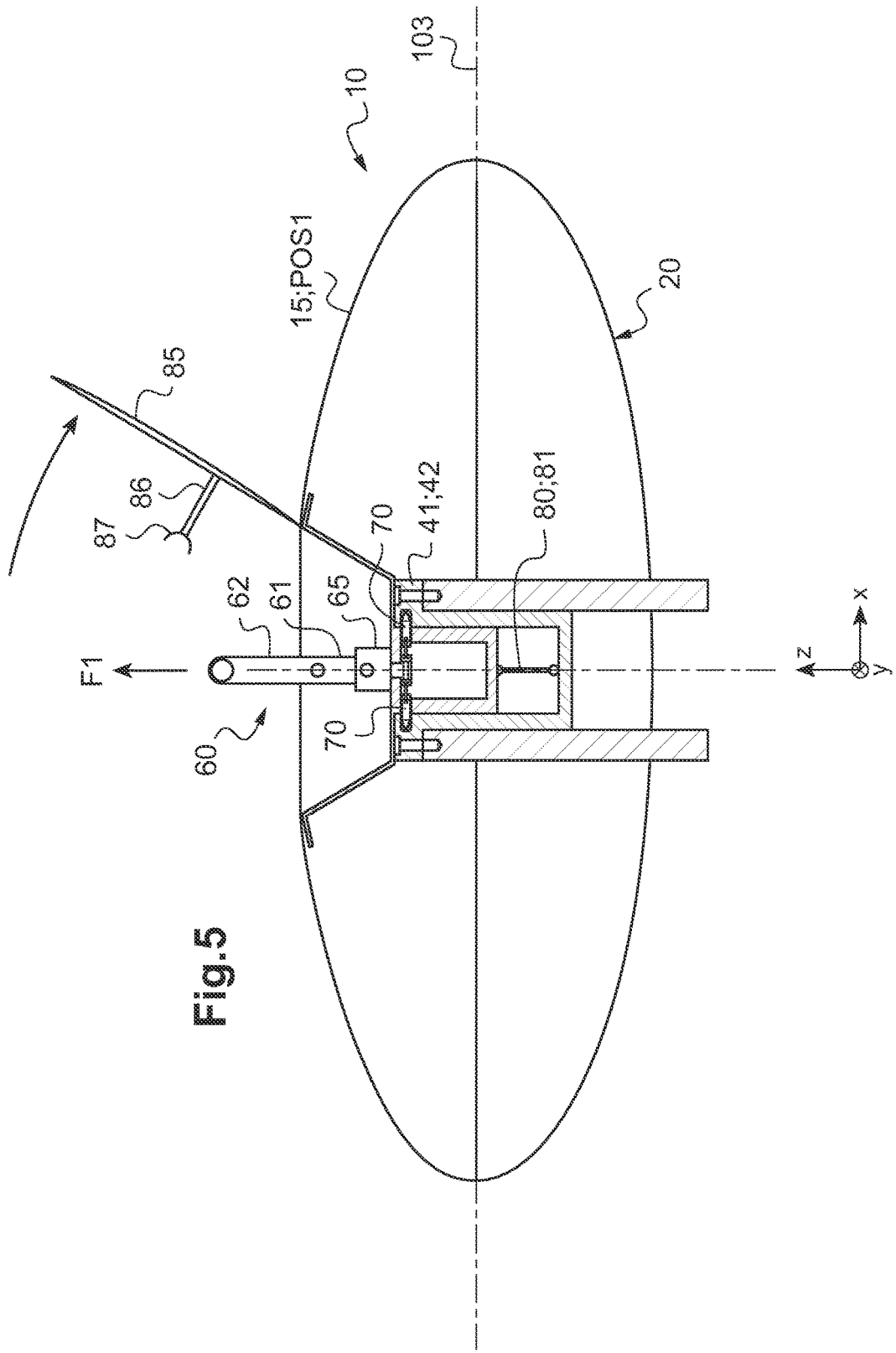
FIG. 5 is a view of an aircraft fitted with a fairing in the second embodiment with an open access hatch and locking fingers engaged in a stationary portion of a slideway.

Elements present in more than one of the figures are given the same references in each of them.

DETAILED DESCRIPTION OF THE INVENTION

It should be observed that three mutually orthogonal directions are shown in shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

The first direction X and the second direction Y together form a plane referred to for convenience as the "horizontal plane XY".

Finally, the third direction Z is said to be in elevation. The term "in elevation" relates to any direction parallel to the third direction Z.

FIG. 1 shows an aircraft 1. In particular, the aircraft 1 may be a rotorcraft.

The rotorcraft 1 has a rotor 2 of the invention. In order to avoid pointlessly overcrowding FIG. 1, only the rotor 2 is shown in the figure.

The rotor 2 moves in rotation about an axis of rotation 100.

The rotor 2 is provided with a head 3 carrying a plurality of blades 7. More precisely, the head 3 has a mast 5 carrying a hub 4. Each blade is then hinged to the hub 4, e.g. via a hinge 6.

Furthermore, the rotor 2 has a fairing 10 in a first embodiment of the invention.

Whatever the embodiment, the fairing may include a "bottom" half-shell 20. Such a bottom half-shell 20 may comprise a single "bottom" half-body 21 having diametral sections that are U-shaped.

The bottom half-shell 20 is secured to the head 3 of the rotor by conventional means. For example, the bottom half-shell 20 is fastened to the mast 5 by means of an angle bar 200. Alternatively, or in addition, the bottom half-shell 20 may be secured to the hub 4.

Whatever the variant, the bottom half-shell is stationary relative to the head 3 of the rotor.

Furthermore, the fairing has a "top" half-shell 15.

Such a top half-shell 15 may comprise a single "top" half-body 16 having diametral sections of an upside-down U-shape. Under such circumstances, the top half-body 16 and the bottom half-body 21 present respective concave inside surfaces 301, 302 facing each other.

The top half-body 16 then represents a dome situated above the head 3 of the rotor and the bottom half-body 21.

Furthermore, the top half-shell 15 and the bottom half-shell 20 are each provided with slots. Thus, the top bottom half-shell 15 has one "top" slot 120 per blade, and the bottom half-shell 20 has one "bottom" slot 130 per blade. Each top slot then faces a bottom slot in order to provide a passage in the fairing through which a blade passes.

Unlike the bottom half-shell 20, the top half-shell 15 is movable relative to the head 3 of the rotor.

The top half-shell 15 can move in translation along an axis 101 in elevation. This axis 101 in elevation is an axis of symmetry of the half-shells. In addition, this axis 101 in elevation advantageously coincides with the axis of rotation 100.

Consequently, the top half-shell 15 may be moved on request from a closed extreme position POS1 shown in FIG. 1, to an open extreme position POS2, visible in FIG. 2.

In the closed extreme position POS1, the top half-shell 15 rests on the bottom half-shell 20. The top half-shell 15 and the bottom half-shell 20 then form a closed enclosure. This enclosure is nevertheless open to the outside of the aircraft via the passages formed by the slots 120, 130 and via a passage in the bottom half-shell through which the mast 5 of the rotor passes.

In this closed extreme position POS1, a portion of a periphery of the top half-shell 15, referred to as the "top contact periphery 17" is at the level of a junction plane 103 in sealed contact with a portion of a periphery of the bottom half-shell referred to as the "bottom contact periphery 22". This junction plane is parallel to the horizontal plane XY, orthogonal to the axis 101 in elevation and orthogonal to the axis of rotation 100.

The top contact periphery 17 corresponds to the portion of this periphery of the top half-shell 15 that does not define a top slot. Likewise, the bottom contact periphery 22 corresponds to the portion of the periphery of the bottom half-shell 20 that does not define a bottom slot.

With reference to FIG. 9, the top half-shell 15 and the bottom half-shell 20 are optionally mutually engaged one in the other in the closed extreme position POS1. The bottom contact periphery 22 then co-operates by shape interference with the top contact periphery 17. For example this contact may take place via conical profiles.

In addition, sealing means 300 may be used at the interface between the half-shells. Such sealing means may comprise a gasket, for example.

With reference to FIG. 1, the fairing comprises a mover device 30 for moving the top half-shell 15. This mover device has a slideway 40.

The slideway 40 then includes a stationary portion 41 that is secured to the head 3 of the rotor 2. The stationary portion 41 could in a variant be fastened in reversible manner to the hub or to the mast.

For example, the stationary portion 41 includes a "stationary" cylinder 42. This stationary cylinder 42 extends in elevation from a bottom 401 towards an open end 402. This open end 402 is then secured to a shoulder 403. The shoulder 403 is then fastened to the head 3 by reversible fastener means 43, such as screws, for example.

Furthermore, the stationary portion 41 advantageously extends within the mast 5. In particular, the stationary cylinder 42 shown in FIG. 1 extends inside the mast 5 with the shoulder 403 resting on the end of the mast.

The slideway also has a movable portion 44 that is movable in translation relative to the stationary portion 41.

The movable portion 44 is secured to the top half-shell 15, e.g. via a base 46.

Under such circumstances, the movable portion 44 and the stationary portion 41 together form a slideway connection. The movable portion 44 can slide along the stationary portion so as to slide along the axis in elevation. The stationary portion 41 thus represents means for guiding the movable portion 44 in translation.

By way of example, the movable portion 44 comprises a hollow cylinder referred to as the "movable" cylinder 45. This movable cylinder 45 extends in elevation from a bottom 404 to an end 405. This end 405 is then secured to the base 46 that is itself secured to the top half-shell 15. Consequently, movement of the movable portion 44 in translation leads to identical movement of the top half-shell 15 in translation.

In addition, the movable cylinder may be arranged in the stationary cylinder or it may be arranged around the stationary cylinder.

Furthermore, the fairing may include a signaling device 90 having the function of visually indicating the position of the top half-shell 15. This signaling device 90 then comprises at least one sensor 93, 94 for determining whether the top half-shell 15 is in the open extreme position POS2 and/or in the closed extreme position POS1. For example, a first position sensor 93 serves to determine whether the top half-shell 15 is in the open extreme position POS2, and a second position sensor 94 serves to determine whether the top half-shell 15 is in the closed extreme position POS1.

Each sensor is connected to display means 95. The display means may comprise at least one indicator lamp that is lit when the top half-shell 15 is in the open extreme position POS2. For example, a first indicator lamp 91 is lit when the top half-shell 15 is in the closed extreme position POS1, and a second indicator lamp 92 is lit when the top half-shell 15 is in the open extreme position POS2.

In addition, a system may enable aerodynamic forces to be taken up directly from the top cap directly to the mast so that these forces do not pass via the mover device.

Furthermore, the mover device 30 includes a driver device 50 for moving the movable portion 44. Consequently, the mover device 30 comprises a guide formed by the slideway 40 and a driver device 50.

The driver device 50 is then activated:

either in order to move the top half-shell 15 away from the bottom half-shell 20 during a maintenance operation by moving the top half-shell from the closed extreme position POS1 to the open extreme position POS2;

or else to press the top half-shell 15 against the bottom half-shell 20 in flight by moving the top half-shell from the open extreme position POS2 to the closed extreme position POS1.

In the first embodiment of FIG. 1, the driver device 50 has an actuator 51 attached to the movable portion 44. By way of example, the actuator extends between a bottom of the movable portion and a bottom of the stationary portion.

This actuator may be connected to a control device 98. By way of example, the control device has a knob that can be operated manually.

In order to perform a maintenance operation, an operator can then operate the control device 98. The control device 98 then sends to an order to the actuator 51, e.g. in the form of an electrical signal.

With reference to FIG. 2, the actuator 51 lengthens in order to move the top half-shell 15 away from the head of the rotor. The lengthening of the actuator may be stopped automatically by the first position sensor 93, for example. The actuator then holds the top half-shell 15 in the open extreme position POS2. The operator can then inspect the head of the rotor.

The display device also indicates that the top half-shell 15 is in the open position.

In order to close the fairing, the operator can operate the control device 98 once more.

FIGS. 3 to 8 show a second embodiment that is mechanical, at least in part.

With reference to FIG. 3, the driver device 50 includes a handle 60 secured to the movable portion 44.

The handle 60 that is shown is a hinged handle. This handle then has a bottom segment 61 that is hinged to the movable portion 44 and a top segment 62 that is hinged to the bottom segment 61.

The handle 60 is received in an internal housing 18 of the top half-shell 15. This housing 18 is defined by the base 46.

Furthermore, the housing is closed in reversible manner by an access hatch 85. The access hatch 85 is hinged to the top half-shell in order to be capable of performing a pivoting movement. Thus, the access hatch can be operated in order to open or close the housing 18.

Furthermore, the access hatch 85 is provided with a pull-tab 86. The pull-tab 86 extends longitudinally from the access hatch to a free end 87 of the pull-tab 86 carrying spring clip means 88.

When the access hatch is closed, the pull-tab is located in the housing, and the spring clip means 88 is engaged on the handle 60. The handle thus tends to hold the access hatch shut.

Furthermore, the handle 60 is connected to the movable portion 44 by a support 65. The bottom section 61 is thus hinged to the support 65.

In addition, the support 65 is hinged to the movable portion 44 by a hinge. This hinge then allows the handle to turn relative to the movable portion 44 about the axis 101 in elevation.

For example, the support 65 has a top portion 65' resting on the movable portion 44. In addition, the support has a stud 65" passing through a top wall of the movable portion 44. Ball bearing means may then optionally be interposed between the top wall and the stud 65" of the support.

Furthermore, the support 65 is connected to at least one locking finger 70 by a cam 71. For example, the movable portion has two locking fingers that are substantially diametrically opposite.

The cam 71 may for example be received in the movable portion 44. In contrast, each locking finger 70 extends parallel to the junction plane, e.g. passing through a vertical wall of the movable portion.

With reference to FIG. 4, the cam 71 may comprise a toothed cylinder 72 secured to the stud 65" and a rack secured to each locking finger 70. Consequently, a turning movement in rotation ROT of the support 65 causes each locking finger 70 to move in translation in a horizontal plane.

In the variant of FIG. 10, the stud 65" is connected to each locking finger 70 by a linkage. The stud 65" is thus secured to a rod 500 that is connected to each locking finger 70 by a respective link 501.

With reference to FIG. 3, the stationary portion 41 then includes at least one orifice 75 per locking finger 70. For example, the stationary cylinder includes one orifice per locking finger.

As shown in FIG. 8, the stationary portion 41 may have a top orifice 77 above a bottom orifice 76 for each locking finger 70.

Under such circumstances, when the locking fingers are arranged in a locking orifice, the movable portion is prevented from moving in translation relative to the stationary portion of the slideway. Consequently, the locking fingers can lock the stationary portion in reversible manner relative to the movable portion either in the closed extreme position, or in the open extreme position, or in the closed extreme position and the open extreme position.

With reference to FIG. 3, the fairing 10 may include assistance means 80 to assist in operating the top half-shell 15. The assistance means 80 comprise a resilient member 81 exerting a deployment force 82 on the top half-shell 15 tending to put it in the open extreme position POS2. This deployment force 82 may for example be less than the weight 83 of the top half-shell 15.

This resilient member 81 may for example be interposed between the movable portion 44 and the stationary portion 41.

FIG. 3 shows an aircraft fitted with a fairing in the second embodiment in the closed extreme position.

The resilient member 81 is retracted. Furthermore, the access hatch is closed and the pull-tab 86 is engaged on the handle.

In order to perform a maintenance operation, and with reference to FIG. 5, the operator opens the access hatch. The pull-tab then exerts a force F1 on the handle 60 in order to deploy it. The spring clip means then releases the handle.

The top half-shell 15 remains in the closed extreme position.

With reference to FIG. 6, the operator operates the handle 60 so as to cause it to turn by moving in rotation in a first direction ROT1.

The locking fingers 70 are then retracted into the movable portion, escaping from the orifices in the stationary portion 41.

With reference to FIG. 7, the operator then pulls the handle along arrow F2 in order to move the movable portion 44. The operator then moves the top half-shell 15 in translation into the open extreme position POS2. This movement in translation is facilitated by the assistance means 80.

Optionally, and in the variant of FIG. 8, the operator then turns the handle in a second direction in order to reinsert the locking fingers in orifices in the stationary portion. The top half-shell 15 is then locked in the open extreme position.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A fairing for a rotor, the fairing comprising a top half-shell for placing above a rotor head, the top half-shell being provided with a single dome-shaped top body, wherein the top half-shell is movable, the fairing including a mover device for moving the top half-shell in elevation, the mover device including a slideway, the slideway being provided with a stationary portion for securing to the head of the rotor, the slideway being provided with a movable portion secured to the top half-shell, the movable portion sliding in elevation along the stationary portion along an axis in elevation, the mover device including a driver device co-operating with the movable portion to move the movable portion in translation relative to the stationary portion from a closed extreme position to an open extreme position, and vice versa, the top half-shell being in the closed extreme position in flight and in the open extreme position during a maintenance operation, and wherein the driver device comprises a handle attached to the movable portion.

2. A fairing according to claim 1, wherein the fairing includes a signaling device for indicating the position of the top half-shell, the signaling device having at least one sensor for determining whether the top half-shell is in the open extreme position and/or in the closed extreme position, and display means connected to the sensor.

3. A fairing according to claim 1, wherein the driver device includes an actuator attached to the movable portion.

4. A fairing according to claim 1, wherein the handle is a hinged handle having a bottom segment hinged to the movable portion and a top segment hinged to the bottom segment.

5. A fairing according to claim 1, wherein the handle is housed in an internal housing of the top half-shell, the housing being closed in reversible manner by an access hatch.

6. A fairing according to claim 5, wherein the access hatch is provided with a pull-tab, the pull-tab having a free end carrying spring clip means engaged on the handle when the access hatch closes the housing.

7. A fairing according to claim 1, wherein the handle is connected to the movable portion by a support, the support being hinged to the movable portion and being movable in rotation to turn relative to the movable portion about the axis in elevation, the support being connected to at least one locking finger by a cam so that a turning movement of the support causes each locking finger to move in translation, the stationary portion including at least one orifice per locking finger, the movable portion being prevented from moving relative to the stationary portion when at least one locking finger penetrates into one of the orifices.

8. A fairing according to claim 7, wherein the stationary portion includes a top orifice above a bottom orifice for each locking finger, each locking fingers being housed in a top orifice in the open extreme position of the top half-shell, each locking finger being housed in a bottom orifice in the closed extreme position of the top half-shell.

9. A fairing according to claim 1, wherein the fairing includes assistance means for assisting in operating the top half-shell, the assistance means comprising a resilient member exerting a deployment force on the top half-shell tending to position it in the open extreme position.

10. A fairing according to claim 9, wherein the resilient member is interposed between the movable portion and the stationary portion.

11. A fairing according to claim 9, wherein the deployment force is less than the weight of the top half-shell.

12. A fairing according to claim 1, wherein the fairing includes a bottom half-shell facing the top half-shell, a portion of a periphery of the top half-shell referred to as the "top contact periphery" being in sealed contact in a junction plane with a portion of a periphery of the bottom half-shell referred to as the "bottom contact periphery" when in the closed extreme position, the junction plane being perpendicular to the axis in elevation, the top half-shell having a plurality of slots, each facing a slot in the bottom half-shell in order to pass a blade.

13. A fairing according to claim 12, wherein the top half-shell and the bottom half-shell are mutually engaged one in the other in the closed extreme position, the bottom contact periphery co-operating by shape interference with the top contact periphery.

14. A rotor provided with a rotor head, the head of the rotor including firstly a mast rotatably about an axis of rotation and secondly a hub secured to the mast, the hub carrying a plurality of blades, the rotor including a fairing, wherein the fairing is a fairing according to claim 1, the stationary portion being secured by reversible fastener means either to the hub or to the mast.

15. A rotor according to claim 14, wherein the stationary portion extends at least in part inside the mast.

16. A rotor according to claim 14, wherein the fairing extends in elevation along an axis in elevation coinciding with the axis of rotation.

17. A rotor according to claim 14, wherein the fairing has a bottom half-shell, and the bottom half-shell is fastened to the rotor head.

18. An aircraft, wherein the aircraft includes a rotor according to claim 14.

* * * * *